(12) United States Patent
Schreiber et al.

(10) Patent No.: US 11,636,801 B2
(45) Date of Patent: Apr. 25, 2023

(54) COMPUTER CONSOLE FOR THROTTLING THE VIDEO BITRATE OF VIDEO STREAMS TO INTERFACE WITH AN ELECTRONIC DEVICE

(71) Applicant: Apple Inc., Cupertino, CA (US)

(72) Inventors: Reese A. Schreiber, Sunnyvale, CA (US); Carlos M. Calderon, San Jose, CA (US); Collin L. Pieper, San Francisco, CA (US); Ian P. Shaeffer, Los Gatos, CA (US); Jeffrey R. Wilcox, San Jose, CA (US); Robert L. Ridenour, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/308,823

(22) Filed: May 5, 2021

(65) Prior Publication Data

US 2021/0383740 A1 Dec. 9, 2021

Related U.S. Application Data

(60) Provisional application No. 63/034,242, filed on Jun. 3, 2020.

(51) Int. Cl.
*H04N 7/01* (2006.01)
*G09G 3/20* (2006.01)

(52) U.S. Cl.
CPC ............. *G09G 3/2096* (2013.01); *H04N 7/01* (2013.01); *G09G 2360/10* (2013.01)

(58) Field of Classification Search
CPC ............. G09G 3/2096; G09G 2360/10; G09G 2350/00; G09G 2360/02; H04N 7/01; H04N 21/2662; H04N 21/43615; H04N 21/43632; H04N 21/4402; H04N 21/44227
See application file for complete search history.

(56) References Cited

U.S. PATENT DOCUMENTS

| | | | | |
|---|---|---|---|---|
| 2013/0132633 A1* | 5/2013 | Kim Yeung | ............ | G06F 13/36 710/306 |
| 2013/0163474 A1* | 6/2013 | Chandra | ............. | H04L 12/4625 370/254 |
| 2019/0114282 A1* | 4/2019 | Kobayashi | .............. | G06F 13/42 |
| 2021/0360394 A1* | 11/2021 | Yocam | ................... | H04N 7/167 |

* cited by examiner

*Primary Examiner* — Chad M Dicke
(74) *Attorney, Agent, or Firm* — Sterne, Kessler, Goldstein & Fox P.L.L.C.

(57) ABSTRACT

An exemplary computer console can generate one or more video streams having image data relating to an image or a series of images, also referred to as video, to be presented by an electronic display device. The exemplary computer console can provide the one or more video streams to the electronic display device over one or more transport streams. The exemplary computer console can effectively throttle a video stream bitrate of the one or more video streams to be less than of the standard defined transport stream bitrate of the one or more transport streams to allow the transport of the one or more video streams over the one or more transport streams.

20 Claims, 4 Drawing Sheets

COMPUTER CONSOLE FOR THROTTLING THE VIDEO BITRATE OF VIDEO STREAMS TO INTERFACE WITH AN ELECTRONIC DEVICE

CROSS-REFERENCE TO RELATED APPLICATIONS

The present application claims the benefit of U.S. Provisional Patent Appl. No. 63/034,242, filed Jun. 3, 2020, which is incorporated herein by reference in its entirety.

BACKGROUND

Field of Disclosure

The described embodiments generally relate to transporting of one or more video streams between a computer console and an electronic display device, including throttling a standard defined video stream bitrate of the one or more video streams to transport these video streams from the computer console to the electronic display device at a standard defined transport stream bitrate which is less than the standard defined video stream bitrate.

Related Art

A computer console can be connected to various ancillary input and/or output electronic devices, often referred to as peripheral devices, which can provide various inputs to the computer console and/or receive various outputs from the computer console. These peripheral devices can include an electronic display device which receives images from the computer console over a transport stream and thereafter presents these images in a visual form onto a display panel, for example, an electroluminescent (ELD) display panel, a liquid crystal display (LCD) panel, a light-emitting diode (LED) display panel, a plasma display panel (PDP), or a quantum dot (QLED) display panel to provide some examples. This electronic display device is often characterized by its display resolution, its refresh rate, and its color depth. Advances in display panel technology have allowed this electronic display device to display the images received from the computer console at greater resolutions, faster display refresh rates, and/or more color depths. As a result, the electronic display device needs to receive the images from the computer console at faster bitrates to drive its display panel at these greater resolutions, faster display refresh rates, and/or more color depths as display panel technology continues to advance. However, the bitrates of the transport stream for transporting these images from the computer console to the electronic display device have remained constant as the display panel technology continues to advance. As a result, the electronic display device can no longer drive its display panel at these greater resolutions, faster display refresh rates, and/or more color depths by receiving images from the computer console at these constant bitrates as the display panel technology continues to advance.

SUMMARY

Some embodiments of this disclosure can include a computer console for interfacing with an electronic display device. In these embodiments, the computer console can include a graphics sub-system and a transport stream controller. The graphics sub-system generates one or more video streams having a video bitrate that is less than a standard defined video stream bitrate as specified in a first digital interface standard. The transport stream controller transports the one or more video streams over one or more transport streams to the electronic display device at a standard defined transport stream bitrate as specified in a second digital interface standard that is different from the first digital interface standard. In these embodiments, the standard defined transport stream bitrate can be less than the standard defined video stream bitrate.

Some embodiments of this disclosure can include a method for interfacing with an electronic display device. In these embodiments, the method includes generating one or more video streams having a video bitrate that is less than a standard defined video stream bitrate as specified in a first digital interface standard. In these embodiments, the method transporting the one or more video streams over one or more transport streams to the electronic display device at a standard defined transport stream bitrate as specified in a second digital interface standard that is different from the first digital interface standard. In these embodiments, the standard defined transport stream bitrate can be less than the standard defined video stream bitrate.

Some embodiments of this disclosure can include a system for displaying an image. In these embodiments, the system can include a computer console and an electronic display device. In these embodiments, the computer console generates one or more video streams having image data relating to the image and a video bitrate that is less than a standard defined video stream bitrate as specified in a first digital interface standard. In these embodiments, the computer console transports the one or more video streams over one or more transport streams to the electronic display device at a standard defined transport stream bitrate as specified in a second digital interface standard that is different from the first digital interface standard. In these embodiments, the standard defined transport stream bitrate can be less than the standard defined video stream bitrate. In these embodiments, the electronic display device displays the image recovered from the one or more transport streams.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1:
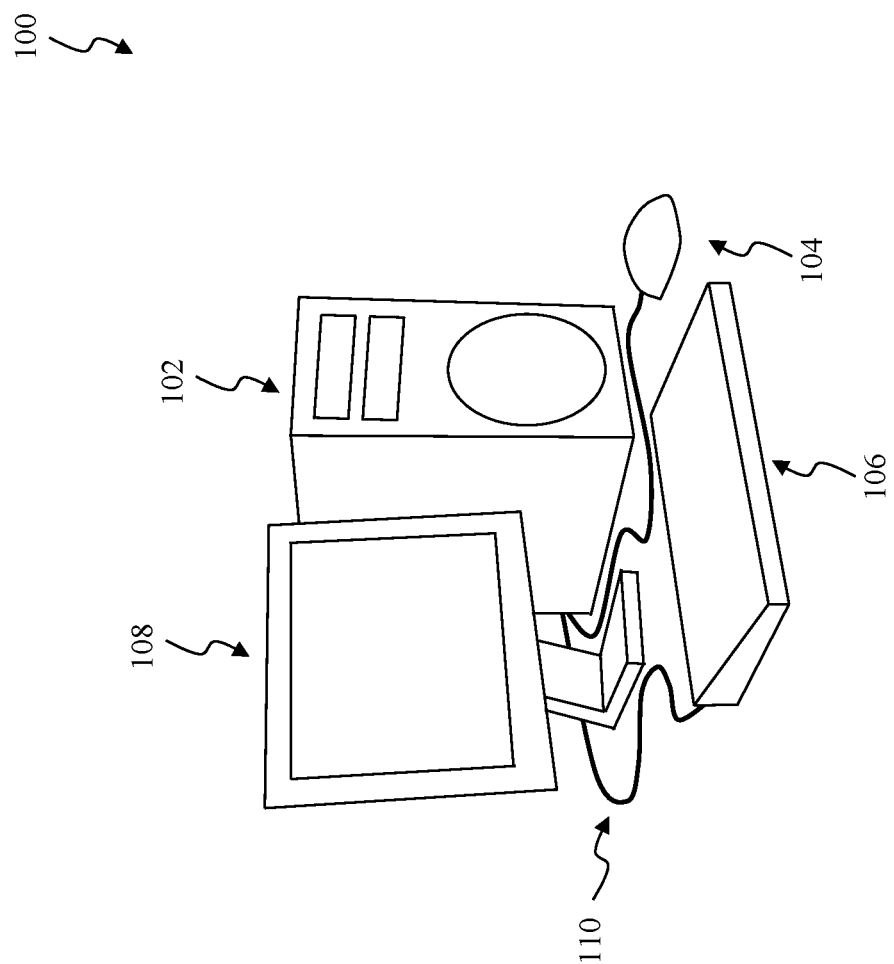
FIG. 1 graphically illustrates an exemplary computing environment in accordance with various embodiments.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

An exemplary computer console can generate one or more video streams having image data relating to an image or a series of images, also referred to as video, to be presented by an electronic display device. In some embodiments, the one or more video streams can represent two (2) DisplayPort High Bitrate 3 (HBR3) video streams as specified in the DisplayPort HBR3 digital interface standard having a standard defined video stream bitrate of 64.8 Gbit/s per the two (2) DisplayPort HBR3 video streams. The exemplary computer console can provide the one or more video streams to the electronic display device over one or more transport streams. In some embodiments, the one or more transport streams can represent one (1) Thunderbolt 3 transport stream having a standard defined transport stream bitrate of 40 Gbit/s per the one (1) Thunderbolt 3 transport stream. The exemplary computer console can effectively throttle a video stream bitrate of the one or more video streams to be less than of the standard defined transport stream bitrate of the one or more transport streams to allow the transport of the one or more video streams over the one or more transport streams. In some embodiments, the exemplary computer console can effectively throttle the video stream bitrate of the one or more video streams from the standard defined video stream bitrate of 64.8 Gbit/s per the two (2) DisplayPort HBR3 video streams by 60% to be 38.88 Gbit/s per the two (2) DisplayPort HBR3 video streams to allow the transport of the one or more video streams using the 40 Gbit/s standard defined transport stream bitrate of the one (1) Thunderbolt 3 transport stream.

Exemplary Computing Environment

FIG. 1 graphically illustrates an exemplary computing environment in accordance with various embodiments. In the exemplary embodiment illustrated in FIG. 1, an exemplary computing environment 100 represents one or more interconnected electrical, mechanical, and/or electromechanical machines that perform one or more processes, one or more calculations, and/or one or more operations based on instructions provided by one or more software programs and/or one or more hardware programs. In the exemplary embodiment illustrated in FIG. 1, the exemplary computing environment 100 includes a computer console 102, a computer mouse 104, a computer keyboard 106, and an electronic display device 108 which are electrically connected to each other through one or more communication cables 110. In some embodiments, the computer console 102, the computer mouse 104, the computer keyboard 106, and the electronic display device 108 can be collectively referred to as a personal computing system.

Although the detailed description to follow is to be described in terms of this personal computing system, those skilled in the relevant art(s) will recognize that the teachings herein are equally applicable to other types of computing systems without departing from the spirit and scope of the present disclosure. Generally, these other types of computing systems can include any suitable electrical, mechanical, and/or electromechanical machine, or combination of machines, which includes one or more central processing units (CPUs), also referred to as central processors or main processors, and one or more electronic display devices to present information generated by these CPUs in a visual form. In some embodiments, each electrical, mechanical, and/or electromechanical machine can be implemented as a standalone or a discrete device or may be incorporated within or coupled to another electrical device or host device. In some embodiments, these other types of computing systems can include consumer electronics devices, gaming devices, cellular phones, smartphones, feature phones, tablet computers, wearable computer devices, personal digital assistants (PDAs), pagers, wireless handsets, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), networked or "smart" appliances, Machine-Type-Communication (MTC) devices, Machine-to-Machine (M2M) devices, and/or Internet of Things (IoT) devices to provide some examples. In the exemplary embodiment illustrated in FIG. 1, the one or more communication cables 110 represent one or more electrical cables, such as one or more copper wire cables to provide an example, to electrically and mechanically couple the computer console 102, the computer mouse 104, the computer keyboard 106, and the electronic display device 108. However, in some embodiments, the one or more communication cables 110 can alternatively, or additionally, represent one or more signal traces on one or more printed circuit boards (PCBs).

In the exemplary embodiment illustrated in FIG. 1, the computer mouse 104, the computer keyboard 106, and the electronic display device 108 represent peripheral computing devices. However, those skilled in the relevant art(s) will recognize the computing environment 100 can include other input peripheral electronic devices, such as a graphics a tablet, an image scanner, a barcode reader, a game controller, a light pen, a light gun, a microphone, a digital camera, a webcam, and/or a dance pad to provide some examples, other output peripheral electronic devices, such as a projector, a printer, headphones and/or a computer speaker to provide some examples, and/or other input/output peripheral electronic devices, such as a computer data storage device to provide an example, without departing from the spirit and scope of the present disclosure. The computer mouse 104 and the computer keyboard 106 represent a conventional computer mouse and a conventional computer keyboard, respectively, and will not be described in further detail below.

In the exemplary embodiment illustrated in FIG. 1, the computer console 102 generates one or more video streams having image data relating to an image or a series of images, also referred to as video, to be presented by the electronic display device 108. In some embodiments, the one or more video streams can be specified by one or more first digital interface standards, such as a version of DisplayPort, for example, DisplayPort High Bitrate 3 (HBR3). In these embodiments, the one or more first digital interface standards specify a standard defined video stream bitrate, typically expressed in Megabits per second (Mbit/s) or Gigabits per second (Gbit/s), for the one or more video streams. In an exemplary embodiment, the one or more video streams represent two (2) DisplayPort HBR3 video streams as specified in the DisplayPort HBR3 digital interface standard. As specified in the DisplayPort HBR3 digital interface standard, a DisplayPort HBR3 video stream includes four video lanes with each video lane of the DisplayPort HBR3 video stream having a standard defined video stream bitrate of 8.1 Gbit/s for a standard defined video stream bitrate of 32.4 Gbit/s per DisplayPort HBR3 video stream. In this exemplary embodiment, the one or more video streams can include two (2) DisplayPort HBR3 video streams for a standard defined video stream bitrate of 64.8 Gbit/s to operate the electronic display device 108.

As illustrated in FIG. 1, the computer console 102 provides the one or more video streams to the electronic display device 108 over one or more transport streams through the one or more communication cables 110. In some embodiments, the one or more transport streams can be specified by one or more second digital interface standards, such as a version of a Thunderbolt digital interface standard, for example, a Thunderbolt 3 digital interface standard. Similar to the one or more first digital interface standards as described above, the one or more second digital interface standards specify a standard defined transport stream bitrate, typically expressed in Megabits per second (Mbit/s) or Gigabits per second (Gbit/s), for the one or more transport streams. In an exemplary embodiment, the one or more transport streams represent Thunderbolt 3 transport streams as specified in the Thunderbolt 3 digital interface standard. As specified in the Thunderbolt 3 digital interface standard, a Thunderbolt 3 transport stream includes two (2) bonded Thunderbolt 3 transport links with each Thunderbolt 3 transport link having four transport lanes. The Thunderbolt 3 digital interface standard specifies each transport lane of the two (2) bonded Thunderbolt 3 transport links has a standard defined transport stream bitrate of 5 Gbit/s for a standard defined transport stream bitrate of 40 Gbit/s per Thunderbolt 3 transport stream. In an exemplary embodiment, the one or more transport streams can include one (1) Thunderbolt 3 transport stream for a standard defined transport stream bitrate of 40 Gbit/s to provide the one or more video streams to the electronic display device 108.

In the exemplary embodiment illustrated in FIG. 1, the a standard defined video stream bitrate of the one or more video streams, for example, 64.8 Gbit/s for two (2) DisplayPort HBR3 video streams, can exceed the a standard defined transport stream bitrate of the one or more transport streams, for example, 40 Gbit/s for one (1) Thunderbolt 3 transport stream. However, in some embodiments, a video stream bitrate needed by the electronic display device 108 to display the images or the series of images recovered from the one or more transport streams can be less than the standard defined video stream bitrate of the one or more video streams, for example, less than the standard defined video stream bitrate of 64.8 Gbit/s for two (2) DisplayPort HBR3 video streams. In some embodiments, the video stream bitrate needed by the electronic display device 108 to display the images or the series of images is related to at a display resolution, a display refresh rate, and a color depth of the electronic display device 108. In some embodiments, the display resolution of the electronic display device 108 can be 1280×720 pixels ("HD Ready" resolution), 1920×1080 pixels ("Full HD" resolution), 2560×1440 pixels (QHD or Quad HD resolution), 3840×2160 pixels (4K, UHD or Ultra HD resolution), 6016×3384 pixels (6K resolution), 7680×4320 pixels (8K) or any other suitable display resolution that will be apparent to those skilled in the relevant art(s) without departing from the spirit and scope of the present disclosure. In some embodiments, the display refresh rate of the electronic display device 108 can be 60 Hertz (Hz), 75 Hz, 144 Hz, 240 Hz, or any other suitable refresh rate that will be apparent to those skilled in the relevant art(s) without departing from the spirit and scope of the present disclosure. In some embodiments, the color depth of the electronic display device 108 can be 8-bit color, 10-bit color, 12-bit color, 15-bit color, 16-bit color, 18-bit color, 24-bit color, 30-bit color, 36-bit color, 48-bit color, or any other suitable color depth that will be apparent to those skilled in the relevant art(s) without departing from the spirit and scope of the present disclosure. In some embodiments, the video stream bitrate needed by the electronic display 108 to present the image or the series of images, in terms of the display resolution, the display refresh rate, and the color depth, can be determined by:

$$\text{bitrate} = \text{resolution} \times \text{refresh rate} \times \text{color depth}, \qquad (1)$$

where bitrate represents the video stream bitrate needed by the electronic display 108 to present the image or the series of images at the resolution, the display refresh rate. As an example, the video stream bitrate needed by the electronic display 108 to present the image or the series of images at a display resolution of 6016×3384 pixels (6K resolution), a display refresh rate of 60 Hz, and a color depth of 10 bits is approximately 12 Gbit/s which is less than the standard defined transport stream bitrate of 32.4 Gbit/s for one (1) DisplayPort HBR3 video streams. In some embodiments, two (2) DisplayPort HBR3 video streams can be used to provide the image or the series of images to the electronic display 108. In these embodiments, the video stream bitrate needed by the electronic display 108 to present the image or the series of images at a display resolution of 6016×3384 pixels (6K resolution), a display refresh rate of 60 Hz, and a color depth of 10 bits is approximately 24 Gbit/s which is less than the standard defined transport stream bitrate of 64.8 Gbit/s for two (2) DisplayPort HBR3 video streams.

As a result, the computer console 102 can effectively throttle, for example, restrict or reduce, the video stream bitrate of the one or more video streams to be less than or equal to the standard defined transport stream bitrate for the one or more transport streams as specified by the one or more second digital interface standards, such as a version of a Thunderbolt digital interface standard, for example, a Thunderbolt 3 digital interface standard. In an exemplary embodiment, the computer console 102 effectively throttles the video stream bitrate of the one or more video streams to be approximately 60% of the standard defined transport stream bitrate for the one or more transport streams. For example, the DisplayPort HBR3 digital interface standard specifies that two (2) DisplayPort HBR3 video streams can have a standard defined video stream bitrate of 64.8 Gbit/s per the two (2) DisplayPort HBR3 video streams. In this example, the computer console 102 effectively throttles the 64.8 Gbit/s standard defined video stream bitrate of the two (2) DisplayPort HBR3 video streams by 60% to be 38.88 Gbit/s, or 19.44 Gbit/s per DisplayPort HBR3 video stream. In this example, the video stream bitrate of 38.88 Gbit/s of the one or more video streams can be transported using the 40 Gbit/s standard defined transport stream bitrate of one (1) Thunderbolt 3 transport stream. In some embodiments, the computer console 102 can throttle a symbol clocking signal used to generate the one or more video streams. In an exemplary embodiment, a link symbol clock of 810 MHz can be used to generate each video lane of the DisplayPort HBR3 video stream as specified in the DisplayPort HBR3 digital interface standard. In this exemplary embodiment, the computer console 102 can effectively throttle the link symbol clock from 810 MHz to be 486 MHz to effectively throttle the standard defined video stream bitrate of the two (2) DisplayPort HBR3 video streams to be 38.88 Gbit/s, or 19.44 Gbit/s per DisplayPort HBR3 video stream.

In the exemplary embodiment illustrated in FIG. 1, the electronic display device 108 receives the one or more transport streams from the computer console 102 through the one or more communication cables 110. The electronic display device 108 can recover the one or more video streams from the one or more transport streams and can thereafter recover the image data from the one or more video streams. In some embodiments, the electronic display device 108 can recover the one or more video streams at the video stream bitrate from the one or more transport streams and can thereafter recover the image data from the one or more transport streams. In an exemplary embodiment, the electronic display device 108 can recover the one or more video streams using a link symbol clock of 486 MHz which has been throttled from the link symbol clock of 810 MHz as specified in the DisplayPort HBR3 digital interface standard. Once the image data has been recovered from the one or more video streams, the electronic display device 108 can recover the image or the video from the image data and can thereafter drive one or more display panels at the video stream bitrate to present the image or the video recovered from the image data in a visual form. In some embodiments, the one or more display panels can be implemented as an electroluminescent (ELD) display panel, a liquid crystal display (LCD) panel, a light-emitting diode (LED) display panel, a plasma display panel (PDP), or a quantum dot (QLED) display panel to provide some examples.

Exemplary Computer Console within the Exemplary Computing Environment

Figure 2:
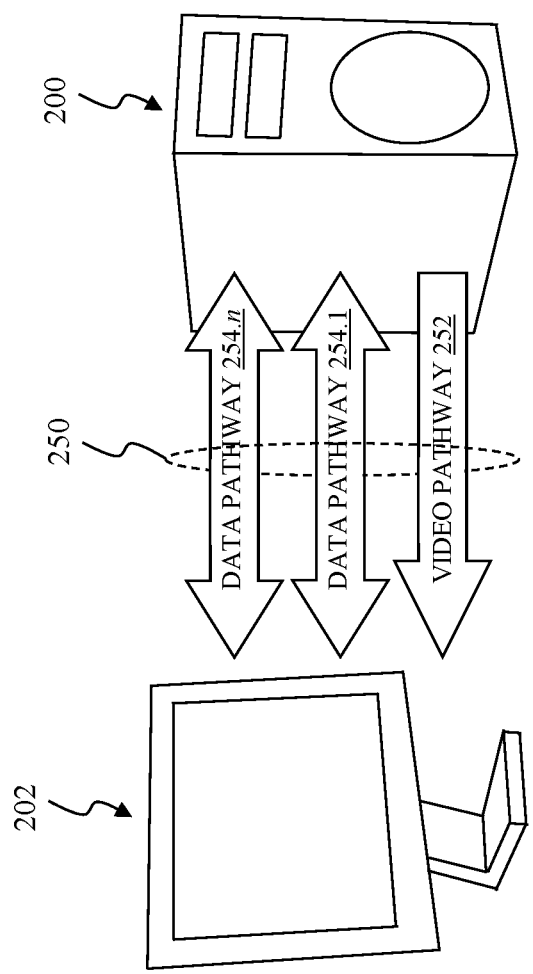
FIG. 2 graphically illustrates an exemplary operation of an exemplary computer console within the exemplary computing environment in accordance with various embodiments.

FIG. 2 graphically illustrates an exemplary operation of an exemplary computer console within the exemplary computing environment in accordance with various embodiments. In the exemplary embodiment illustrated in FIG. 2, a computer console 200 generates one or more video streams having image data relating to an image or a series of images, also referred to as video, to be presented by an electronic display device 202. Thereafter, the computer console 200 provides the one or more video streams to the electronic display device 202 over one or more transport streams 250. The electronic display device 202 receives the one or more transport streams from the computer console 200 and can thereafter recover the image data from the one or more transport streams. Once the image data has been recovered, the electronic display device 202 can present the image or the video which is recovered from the image data in a visual form. The computer console 200 and the electronic display device 202 can represent exemplary embodiments of the computer console 102 and the electronic display device 108 as described above in FIG. 1.

As illustrated in FIG. 2, the one or more transport streams 250 can be configured and arranged into a video pathway 252 and one or more data pathways 254.1 through 254.n. In the exemplary embodiment illustrated in FIG. 2, the computer console 200 can provide the one or more video streams to the electronic display device 202 over the video pathway 252. In the exemplary embodiment illustrated in FIG. 2, the data pathway 254 represents a bi-directional communication pathway between the computer console 200 and the electronic display device 202. In this exemplary embodiment, the computer console 200 can provide information, such as audio data, image data, video data, control data, and/or other suitable data that will be apparent to those skilled in the relevant art(s), to the electronic display device 202 over the one or more data pathways 254.1 through 254.n. Alternatively, or in addition to, the computer console 200 can receive other information, such as other audio data, other image data, other video data, other control data, and/or other suitable data that will be apparent to those skilled in the relevant art(s), from the electronic display device 202 over the one or more data pathways 254.1 through 254.n.

In some embodiments, the video pathway 252 and the one or more data pathways 254.1 through 254.n can represent one or more transport streams as specified in one or more digital interface standards. In an exemplary embodiment, the video pathway 252 and the data pathway 254.1 from among the one or more data pathways 254.1 through 254.n can represent a first transport stream as specified in a first digital interface standard and the data pathways 254.2 through 254.n from among the one or more data pathways 254.1 through 254.n can represent one or more second data streams as specified in one or more second digital interface standards. In the exemplary embodiment illustrated in FIG. 2, the video pathway 252 and the data pathway 254.1 can transport at their respective transport stream bitrates. The collective combination of the transport stream bitrate of the video pathway 252 and the transport stream bitrate of the data pathway 254.1 occupies the standard defined transport stream bitrate as specified in the first digital interface standard, for example, the standard defined transport stream bitrate of 40 Gbit/s of the one (1) Thunderbolt 3 transport stream. In some embodiments, the computer console 200 can prioritize the video pathway 252 over the data pathway 254.1 to ensure that the video pathway 252 can utilize the standard defined transport stream bitrate to transport the one or more video streams to the electronic display device 202. The computer console 200 can throttle the transport stream bitrate of the data pathway 254.1, disable the data pathway 254.1, and/or shift the transport of the information to the electronic display device 202 and the reception of the other information from the electronic display device 202 from the data pathway 254.1 to the data pathways 254.2 through 254.n.

As an example, the video pathway 252 and the data pathway 254.1 can represent one (1) Thunderbolt 3 transport stream as specified in the Thunderbolt 3 digital interface standard and the data pathway 254.2 can represent a Universal Serial Bus (USB) transport stream as specified in a version of the USB digital interface standard, such as USB 3.1 to provide an example. In this example, the video pathway 252 and the data pathway 254.1 both share the standard defined transport stream bitrate of 40 Gbit/s of the one (1) Thunderbolt 3 transport stream. The computer console 200 can throttle the transport stream bitrate of the data pathway 254.1, disable the data pathway 254.1, and/or shift the transport of the information to the electronic display device 202 and the reception of the other information from the electronic display device 202 from the data pathway 254.1 to the data pathway 254.2. This ensures that the standard defined transport stream bitrate of 40 Gbit/s of the one (1) Thunderbolt 3 transport stream is available to the computer console 200 to provide the one or more video streams to the electronic display device 202 over the video pathway 252.

Figure 3:
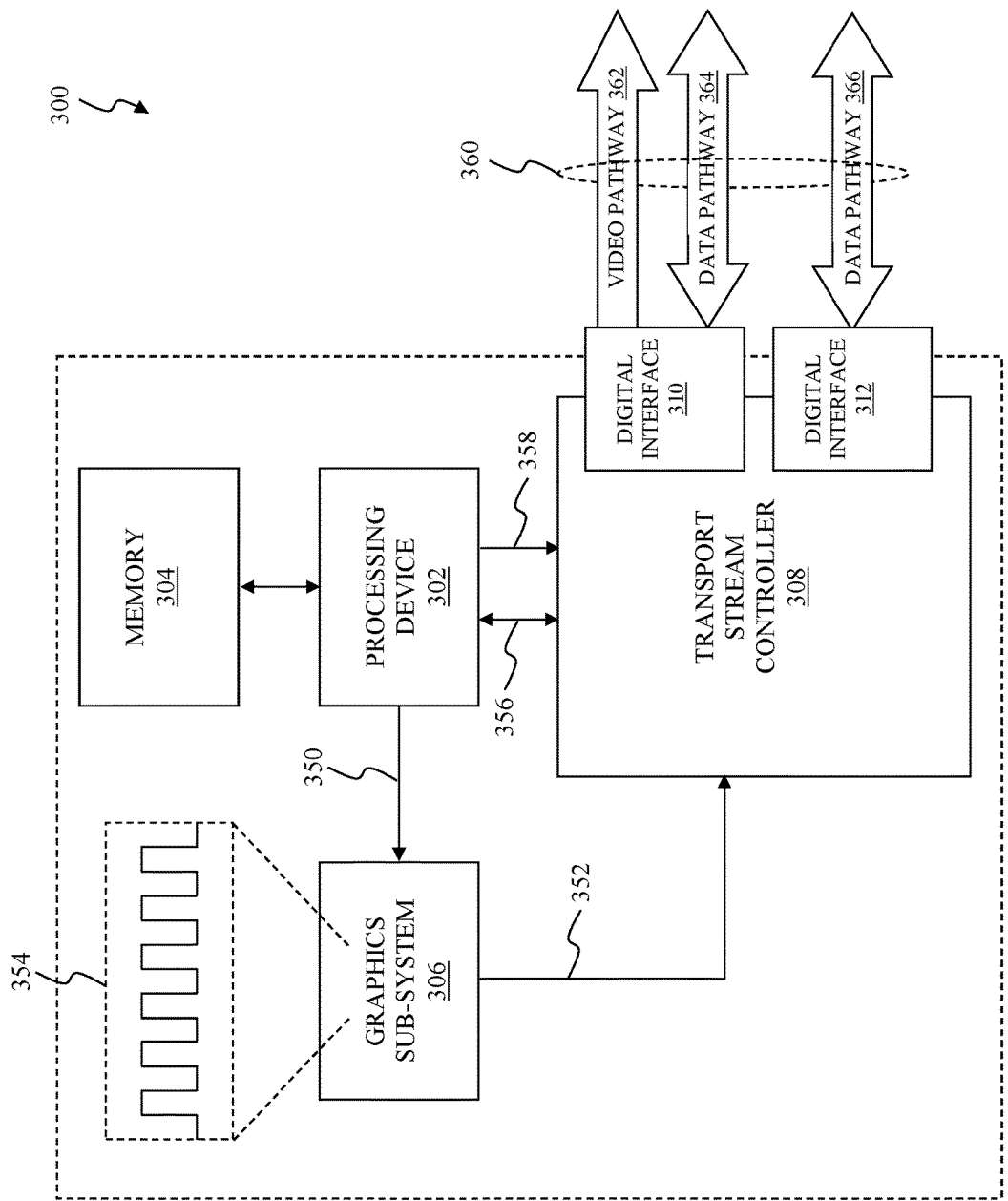
FIG. 3 graphically illustrates a simplified block diagram of the exemplary computer console in accordance with various embodiments.

FIG. 3 graphically illustrates a simplified block diagram of the exemplary computer console in accordance with various embodiments. In the exemplary embodiment illustrated in FIG. 2, a computer console 300 generates one or more video streams having image data relating to an image or a series of images, also referred to as video, to be presented by an electronic display device, such as the electronic display device 108 as described above in FIG. 1 and/or the electronic display device 202 as described above in FIG. 2. As illustrated in FIG. 1, the computer console 300 can include a processing device 302, a memory 304, a graphics sub-system 306, and a transport stream controller 308. Although not illustrated in FIG. 3, the computer console 300 can include other well-known components, such as a motherboard, a power supply, a hard disk drive, a solid state drive, and/or an optical drive to provide some examples which will be apparent to those skilled in the relevant art(s) without departing from the spirit and scope of the present disclosure. These other well-known components are not illustrated in FIG. 3. The computer console 300 can represent an exemplary embodiment of the computer console 102 as described above in FIG. 1 and/or the computer console 200 as described above in FIG. 2.

The processing device 302 represents one or more processors such as a microprocessor or a central processing unit to provide some examples. In the exemplary embodiment illustrated in FIG. 3, the processing device 302 can execute a collection of instructions, often referred to as computer programs, to perform arithmetic, logic, controlling, and input/output (I/O) operations specified by the instructions in the computer programs. In some embodiments, the processing device 302 can include an arithmetic logic unit (ALU) to perform the arithmetic and the logic operations, registers to provide information to the ALU and to store results of the arithmetic and the logic operations, and a control unit to execute the computer programs by directing the ALU, registers and other components of the computer console 300. In some embodiments, the processing device 302 can be implemented using a complex instruction set computing (CISC) microprocessor, reduced instruction set computing (RISC) microprocessor, very long instruction word (VLIW) microprocessor, or a processor implementing other instruction sets, or processors implementing a combination of instruction sets to provide some examples. In some embodiments, the processing device 302 can also be implemented using one or more special-purpose processing devices, such as an application specific integrated circuit (ASIC), a field programmable gate array (FPGA), a digital signal processor (DSP), and/or a network processor.

As illustrated in FIG. 3, the processing device 302 can provide image data 350 relating to an image or a series of images, also referred to as video, to the graphics sub-system 306 for rendering. In some embodiments, the processing device 302 can provide information, such as audio data, image data, video data, control data, and/or other suitable data that will be apparent to those skilled in the relevant art(s) to provide some examples, to the transport stream controller 308 over information streams 356 and 358. As illustrated in FIG. 3, the information stream 356 represents a bi-directional transport stream that can be utilized by the processing device 302 to provide the information to the transport stream controller 308 and to receive other information, such as other audio data, other image data, other video data, other control data, and/or other suitable data that will be apparent to those skilled in the relevant art(s) to provide some examples, from the transport stream controller 308 that was provided by the electronic display device. In some embodiments, the information streams 356 and 358 can represent one or more data streams as specified by the one or more digital interface standards. In an exemplary embodiment, the information stream 356 can represent one or more PCIe information streams as specified in a version of Peripheral Component Interconnect Express (PCIe) and the information stream 358 can represent one or more DisplayPort as specified in accordance with a version of DisplayPort.

The memory 304 stores information, such as the computer programs, for use in by the processing device 302. The memory 304 can be implemented as a volatile memory storage device, such as a random-access memory (RAM) storage device to provide an example, which requires power to maintain the electronic data, or a non-volatile memory storage device, such as a read-only memory (ROM) storage device to provide an example, which can maintain the electronic data even when not powered. The RAM storage device can be implemented in a dynamic random-access memory (DRAM), a static random-access memory (SRAM), and/or a non-volatile random-access memory (NVRAM), often referred to as a flash memory, configuration to provide some examples. The ROM storage device can be implemented in programmable read-only memory (PROM), a one-time programmable ROM (OTP), an erasable programmable read-only memory (EPROM) and/or an electrically erasable programmable read-only memory (EEPROM) configuration to provide some examples.

The graphics sub-system 306 renders the image data 350 to generate rendered image data and thereafter provides the rendered image data over one or more video streams 352 to the transport stream controller 308. In some embodiments, the graphics sub-system 306 can perform mathematical and geometric calculations using, for example, a Graphical Processing Unit (GPU), to render the image data 350 to generate rendered image data. In some embodiments, the one or more video streams 352 can be specified by one or more digital interface standards, such as a version of DisplayPort to provide an example. In the exemplary embodiment illustrated in FIG. 3, the graphics sub-system 306 effectively throttles a standard defined video stream bitrate of the one or more video streams 352 as specified by the one or more digital interface standards to be less than a standard defined transport stream bitrate of one or more transport streams 360 as specified by the one or more second digital interface standards. In an exemplary embodiment, the one or more video streams 352 represent two (2) DisplayPort High Bitrate 3 (HBR3) video streams as specified in the DisplayPort HBR3 digital interface standard. The HBR3 digital interface standard specifies that these two (2) DisplayPort HBR3 video streams can have a standard defined video stream bitrate of 64.8 Gbit/s. In this exemplary embodiment, the graphics sub-system 306 effectively throttles the 64.8 Gbit/s standard defined video stream bitrate of the two (2) DisplayPort HBR3 video streams by 60% to be 38.88 Gbit/s, or 19.44 Gbit/s per DisplayPort HBR3 video stream. In the exemplary embodiment illustrated in FIG. 3, the graphics sub-system 306 can throttle a symbol clocking signal 354 used to generate the one or more video streams 352. In an exemplary embodiment, a link symbol clock of 810 MHz can be used to generate each video lane of the DisplayPort HBR3 video stream as specified in the DisplayPort HBR3 digital interface standard. In this exemplary embodiment, the graphics sub-system 306 can effectively throttle the link symbol clock from 810 MHz by 60% to be 486 MHz to effectively throttle the standard defined video stream bitrate of the two (2) DisplayPort HBR3 video streams to be 38.88 Gbit/s, or 19.44 Gbit/s per DisplayPort HBR3 video stream.

The transport stream controller 308 can provide the one or more video streams 352 to the electronic display device over the one or more transport streams 360. As illustrated in FIG. 3, the one or more transport streams 360 can be configured and arranged into a video pathway 362, a data pathway 364, and a data pathway 366. In some embodiments, the video pathway 362 and the data pathway 364 can represent one (1) Thunderbolt 3 transport stream as specified in the Thunderbolt 3 digital interface standard and the data pathway 366 can represent one or more Universal Serial Bus (USB) transport streams as specified a version of a USB digital interface standard, such as USB 3.1 to provide an example. In the exemplary embodiment illustrated in FIG. 3, the transport stream controller 308 can include a digital interface 310 that is implemented in accordance with a first digital interface standard, such as a version of a Thunderbolt digital interface standard to provide an example, and a digital interface 312 that is implemented in accordance with a second digital interface standard, such as a version of a USB digital interface standard, such as USB 3.1 to provide an example. The digital interface 310 can provide the one or more video streams 352 to the electronic display device over the video pathway 362. Alternatively, or in addition to, the digital interface 310 and the digital interface 312 can provide the information streams 356 and 358 to the electronic display device over the data pathway 364 and the data pathway 366, respectively. Alternatively, or in addition to, the digital interface 310 and the digital interface 312 can receive other information, such as other audio data, other image data, other video data, other control data, and/or other suitable data that will be apparent to those skilled in the relevant art(s), from the electronic display device over the data pathway 364 and the data pathway 366, respectively.

In the exemplary embodiment illustrated in FIG. 3, the collective combination of the transport stream bitrate of video pathway 362 and the transport stream bitrate of data pathway 364 occupies the standard defined transport stream bitrate of 40 Gbit/s of the one (1) Thunderbolt 3 transport stream. In some embodiments, the transport stream controller 308 can prioritize the video pathway 362 over the data pathway 364 to ensure that the standard defined transport stream bitrate of 40 Gbit/s of the one (1) Thunderbolt 3 transport stream is available to the video pathway 362 to transport the one or more video streams 352 to the electronic display device. The transport stream controller 308 throttle the transport stream bitrate of the data pathway 364, disable the data pathway 364, and/or shift the transport of the information to the electronic display device and the reception of the other information from the electronic display device from the data pathway 364 to the data pathway 366.

Figure 4:
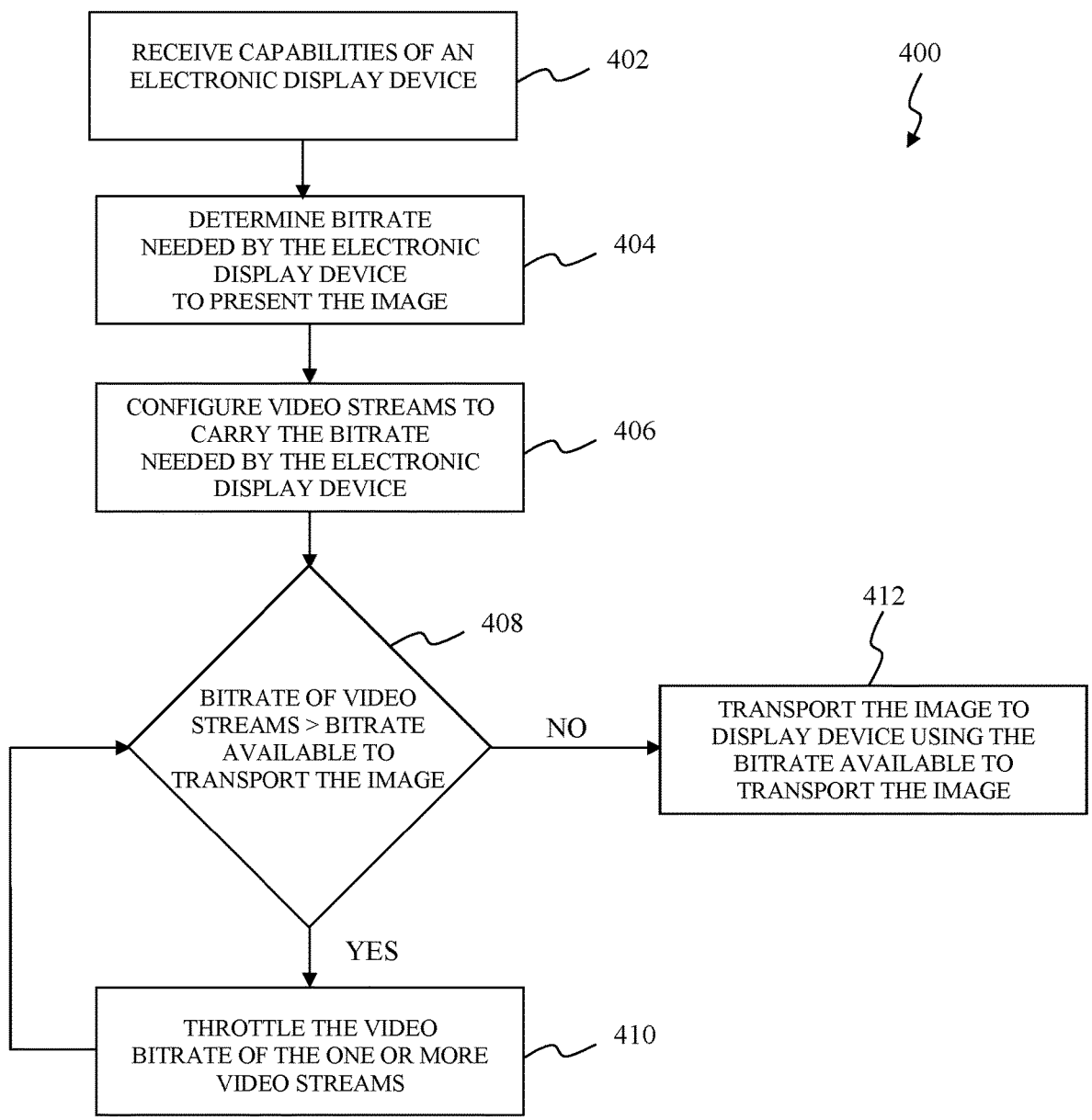
FIG. 4 illustrates a flowchart of an exemplary operation of the exemplary computer console in accordance with various embodiments.

Exemplary Operation of Computer Console within the Exemplary Computing Environment FIG. 4 illustrates a flowchart of an exemplary operation of the exemplary computer console in accordance with various embodiments. The disclosure is not limited to this operational description. Rather, it will be apparent to ordinary persons skilled in the relevant art(s) that other operational control flows are within the scope and spirit of the disclosure. As described above in FIG. 1 through FIG. 3, the video stream bitrate of the one or more video streams can be throttled, for example, restricted or reduced, to be less than or equal to an standard defined transport stream bitrate for the one or more transport streams as specified in one or more first digital interface standards, such as a version of DisplayPort, for example, DisplayPort High Bitrate 3 (HBR3). As an example, the DisplayPort HBR3 interface standard specifies a standard defined video stream bitrate of 64.8 Gbit/s for two (2) DisplayPort HBR3 video streams. In this example, the standard defined video stream bitrate of 64.8 Gbit/s for two (2) DisplayPort HBR3 video streams can be throttled by 60% to be 38.88 Gbit/s, or 19.44 Gbit/s per DisplayPort HBR3 video stream. This allows the one or more video streams to be transported in accordance with a standard defined transport stream bitrate as specified by one or more second digital interface standards, such as a version of a Thunderbolt digital interface standard, for example, a Thunderbolt 3 digital interface standard. The Thunderbolt 3 digital interface standard specifies that one (1) Thunderbolt 3 transport stream includes a standard defined transport stream bitrate of 40 Gbit/s per transport stream. In this example, the 38.88 Gbit/s video stream bitrate of the two (2) DisplayPort HBR3 video streams be transported using the 40 Gbit/s standard defined transport stream bitrate of the one (1) Thunderbolt 3 transport stream. The operational control flow 400 can be performed by the computer console 102 as described above in FIG. 1, the computer console 200 as described above in FIG. 2, and the computer console 300 as described above in FIG. 3.

At operation 402, the operational control flow 400 receives the capabilities of an electronic display device, such as the electronic display device 108 as described above in FIG. 1, and/or the electronic display device 202 as described above in FIG. 2 to provide an example, over a data pathway, such as one or more of the one or more data pathways 254.1 through 254.n as described above in FIG. 2 and/or the data pathway 364 and/or the data pathway 366 as described above in FIG. 3. In some embodiments, the operational control flow 400 can receive a configuration profile of the electronic display device from the electronic device over the data pathway. In these embodiments, the configuration profile can outline one or more parameters, one or more characteristics, and/or one or more attributes of the electronic display device. In some embodiments, these parameters, characteristics, and/or attributes of the electronic display device can include a model name, a serial number, a manufacturer name, a display resolution, a display refresh rate, a color depth, and/or an interface standard and/or protocol of the electronic display device.

At operation 404, the operational control flow 400 determines a bitrate needed by the electronic display device from operation 402 to present an image or a series of images, also referred to as video. In these embodiments, the operational control flow 400 determines the bitrate needed by the electronic display device to present the image or the series of images. In some embodiments, the video stream bitrate needed by the electronic display to present the image or the series of images, in terms of the display resolution, the display refresh rate, and the color depth, can be determined by:

$$\text{bitrate} = \text{resolution} \times \text{refresh rate} \times \text{color depth}, \quad (2)$$

where bitrate represents the video stream bitrate needed by the electronic display to present the image or the series of images at the resolution, the display refresh rate. As an example, the video stream bitrate needed by the electronic display to present the image or the series of images at a display resolution of 6016×3384 pixels (6K resolution), a display refresh rate of 60 Hz, and a color depth of 10 bits is approximately 12 Gbit/s which is less than the standard defined transport stream bitrate of 32.4 Gbit/s for one (1) DisplayPort HBR3 video streams. In some embodiments, two (2) DisplayPort HBR3 video streams can be used to provide the image or the series of images to the electronic display. In these embodiments, the video stream bitrate needed by the electronic display to present the image or the series of images at a display resolution of 6016×3384 pixels (6K resolution), a display refresh rate of 60 Hz, and a color depth of 10 bits is approximately 24 Gbit/s which is less than the standard defined transport stream bitrate of 64.8 Gbit/s for two (2) DisplayPort HBR3 video streams. In some embodiments, the display resolution, the display refresh rate, and/or the color depth can be obtained from the configuration profile of the electronic display device received in operation 402.

At operation 406, the operational control flow 400 configures a video stream bitrate of one or more video streams having image data relating to the image or the series of images from operation 404 to transport the image data at the bitrate needed by the electronic display device from operation 404. In some embodiments, the operational control flow 400 can configure video stream bitrate of one or more video streams as specified by one or more first digital interface standards, such as a version of DisplayPort, for example, DisplayPort HBR3. As specified in the DisplayPort HBR3 digital interface standard, two (2) DisplayPort HBR3 video streams have a standard defined video stream bitrate of 64.8 Gbit/s per the two (2) DisplayPort HBR3 video streams. In these embodiments, the operational control flow 400 can configures the video stream bitrate of the two (2) DisplayPort HBR3 video streams to be 64.8 Gbit/s per the two (2) DisplayPort HBR3 video streams.

At operation 408, the operational control flow 400 determines whether the video stream bitrate of one or more video streams from operation 406 is greater than a standard defined transport stream bitrate as specified by one or more second digital interface standards, such as a version of a Thunderbolt digital interface standard, for example, a Thunderbolt 3 digital interface standard, to transport the image or the series of images over a video pathway, such as the video pathway 252 as described above in FIG. 2 and/or the video pathway 362 as described above in FIG. 3. As an example, the Thunderbolt 3 digital interface standard specifies that one (1) Thunderbolt 3 transport stream includes a standard defined transport stream bitrate of 40 Gbit/s per transport stream. In this example, the operational control flow 400 determines whether the video stream bitrate of from operation 406 is greater than the standard defined transport stream bitrate of 40 Gbit/s of the one (1) Thunderbolt 3 transport stream.

In some embodiments, standard defined transport stream bitrate of 40 Gbit/s of the one (1) Thunderbolt 3 transport stream can accommodate the data pathway from operation 402 and the video pathway. In these embodiments, the operational control flow 400 can effectively disregard the data pathway from operation 402, for example, by disabling the data pathway from operation 402. This allows the standard defined transport stream bitrate, for example, the standard defined transport stream bitrate of 40 Gbit/s of the one (1) Thunderbolt 3 transport stream, to be available to the video pathway to transport the image or the series of images. The operational control flow proceeds to operation 410 when the video stream bitrate of the one or more video streams from operation 406 is greater than the standard defined transport stream bitrate to transport the image or the series of images. Otherwise, the operational control flow proceeds to operation 412 when the video stream bitrate of the one or more video streams from operation 406 is less than or equal to the standard defined transport stream bitrate to transport the image or the series of images.

At operation 410, the operational control flow 400 throttles, for example, restricts or reduces, the video stream bitrate of the one or more video streams from operation 404 to be less than or equal to the standard defined transport stream bitrate from operation 408. As described above, the one or more video streams include image data relating to the image or the series of images from operation 408 to be presented by the electronic display device 108. In some embodiments, the one or more video streams can be specified by one or more first digital interface standards, such as a version of DisplayPort, for example, DisplayPort HBR3. As specified in the DisplayPort HBR3 digital interface standard, two (2) DisplayPort HBR3 video streams have a standard defined video stream bitrate of 64.8 Gbit/s per the two (2) DisplayPort HBR3 video streams. The operational control flow 400 effectively throttles the 64.8 Gbit/s a standard defined video stream bitrate of the two (2) DisplayPort HBR3 video streams by 60% to be 38.88 Gbit/s, or 19.44 Gbit/s per DisplayPort HBR3 video stream. In this example, the video stream bitrate of 38.88 Gbit/s of the one or more video streams can be transported using the 40 Gbit/s standard defined transport stream bitrate of one (1) Thunderbolt 3 transport stream.

At operation 412, the operational control flow 400 transports the one or more video streams from operation 404 having the image or the series of images over the video pathway when the video stream bitrate of the one or more video streams from operation 406 is less than or equal to the standard defined transport stream bitrate to transport the image or the series of images.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A computer console for interfacing with an electronic display device, the computer console comprising:
 a graphics sub-system configured to:
  generate one or more video streams having a video bitrate, and
  throttle the video bitrate of the one or more video streams from standard defined video stream bitrate as specified in a first digital interface standard to be less than a standard defined transport stream bitrate as specified in a second digital interface standard that is different from the first digital interface standard; and
 a transport stream controller configured to transport the one or more video streams over one or more transport streams to the electronic display device at the standard defined transport stream bitrate,
 wherein the standard defined transport stream bitrate is less than the standard defined video stream bitrate.

2. The computer console of claim 1, wherein the first digital interface standard comprises a version of a DisplayPort interface standard, and
 wherein the second digital interface standard comprises a version of a Thunderbolt digital interface standard.

3. The computer console of claim 2, wherein the version of the DisplayPort interface standard comprises a DisplayPort High Bitrate 3 (HBR3) interface standard, and
 wherein the version of the Thunderbolt digital interface standard comprises a Thunderbolt 3 interface standard.

4. The computer console of claim 1, wherein the transport stream controller comprises:
 a first digital interface configured to transport information between the computer console and the electronic display device and transport the one or more video streams to the electronic display device over the one or more transport streams in accordance with the second digital interface standard; and
 a second digital interface configured to transport the information between the computer console and the electronic display device in accordance with a third digital interface standard that is different from the second digital interface standard,
 wherein the transport stream controller is further configured to shift the transport of the information from the first digital interface to the second digital interface prior to the first digital interface transporting the one or more video streams over the one or more transport streams.

5. The computer console of claim 4, wherein the third digital interface standard comprises a version of a Universal Serial Bus (USB) digital interface standard.

6. The computer console of claim 4, wherein the first digital interface is configured to transport the information between the computer console and the electronic display device over a data pathway within the one or more transport streams and the one or more video streams over a video pathway within the one or more transport streams, and
 wherein the transport stream controller is further configured to disable the data pathway prior to the first digital interface transporting the one or more video streams over the video pathway.

7. The computer console of claim 1, wherein the graphics sub-system is configured to throttle the video bitrate of the one or more video streams from the standard defined video stream bitrate of one or more DisplayPort HBR3 video streams to be less than a standard defined transport stream bitrate of a Thunderbolt 3 transport stream.

8. A method for interfacing with an electronic display device, the method comprising:
 generating, by a computer console, one or more video streams having a video bitrate;
 throttling, by the computer console, the video bitrate of the one or more video streams from standard defined video stream bitrate as specified in a first digital interface standard to be less than a standard defined transport stream bitrate as specified in a second digital interface standard that is different from the first digital interface standard; and
 transporting, by the computer console, the one or more video streams over one or more transport streams to the electronic display device at the standard defined transport stream bitrate,
 wherein the standard defined transport stream bitrate is less than the standard defined video stream bitrate.

9. The method of claim 8, wherein the first digital interface standard comprises a version of a DisplayPort interface standard, and
 wherein the second digital interface standard comprises a version of a Thunderbolt digital interface standard.

10. The method of claim 9, wherein the version of the DisplayPort interface standard comprises a DisplayPort High Bitrate 3 (HBR3) interface standard, and wherein the version of the Thunderbolt digital interface standard comprises a Thunderbolt 3 interface standard.

11. The method of claim 8, wherein the transporting comprises:
 transporting information between the computer console and the electronic display device and transporting the one or more video streams to the electronic display device over the one or more transport streams using a first digital interface in accordance with the second digital interface standard;
 transporting the information between the computer console and the electronic display device and using a second digital interface in accordance with a third digital interface standard that is different from the second digital interface standard; and
 shifting the transport of the information from the first digital interface to the second digital interface prior to the first digital interface transporting the one or more video streams over the one or more transport streams.

12. The method of claim 11, wherein the third digital interface standard comprises a version of a Universal Serial Bus (USB) digital interface standard.

13. The method of claim 11, the transporting the information using the first digital interface comprises:
transporting the information between the computer console and the electronic display device over a data pathway within the one or more transport streams and the one or more video streams over a video pathway within the one or more transport streams; and
disabling the data pathway prior to the first digital interface transporting the one or more video streams over the video pathway.

14. The method of claim 8, wherein the throttling comprises throttling the video bitrate of the one or more video streams from the standard defined video stream bitrate of one or more DisplayPort HBR3 video streams to be less than a standard defined transport stream bitrate of a Thunderbolt 3 transport stream.

15. A system for displaying an image, the system comprising:
a computer console configured to:
generate one or more video streams having image data relating to the image and a video bitrate,
throttle the video bitrate of the one or more video streams from standard defined video stream bitrate as specified in a first digital interface standard to be less than a standard defined transport stream bitrate as specified in a second digital interface standard that is different from the first digital interface standard, and
transport the one or more video streams over one or more transport streams the standard defined transport stream bitrate,
wherein the standard defined transport stream bitrate is less than the standard defined video stream bitrate; and
an electronic display device configured to:
recover the image from the one or more transport streams, and
display the image recovered from the one or more transport streams.

16. The system of claim 15, wherein the first digital interface standard comprises a version of a DisplayPort interface standard, and
wherein the second digital interface standard comprises a version of a Thunderbolt digital interface standard.

17. The system of claim 16, wherein the version of the DisplayPort interface standard comprises a DisplayPort High Bitrate 3 (HBR3) interface standard, and wherein the version of the Thunderbolt digital interface standard comprises a Thunderbolt 3 interface standard.

18. The system of claim 15, wherein the computer console comprises:
a first digital interface configured to transport information between the computer console and the electronic display device and transport the one or more video streams to the electronic display device over the one or more transport streams in accordance with the second digital interface standard; and
a second digital interface configured to transport the information between the computer console and the electronic display device in accordance with a third digital interface standard that is different from the second digital interface standard,
wherein the transport stream controller is further configured to shift the transport of the information from the first digital interface to the second digital interface prior to the first digital interface transporting the one or more video streams over the one or more transport streams.

19. The system of claim 18, wherein the first digital interface is configured to transport the information between the computer console and the electronic display device over a data pathway within the one or more transport streams and the one or more video streams over a video pathway within the one or more transport streams, and
wherein the transport stream controller is further configured to disable the data pathway prior to the first digital interface transporting the one or more video streams over the video pathway.

20. The system of claim 15, wherein the computer console is configured to throttle the video bitrate of the one or more video streams from the standard defined video stream bitrate of one or more DisplayPort HBR3 video streams to be less than a standard defined transport stream bitrate of a Thunderbolt 3 transport stream.

* * * * *